United States Patent Office 3,276,439
Patented Oct. 4, 1966

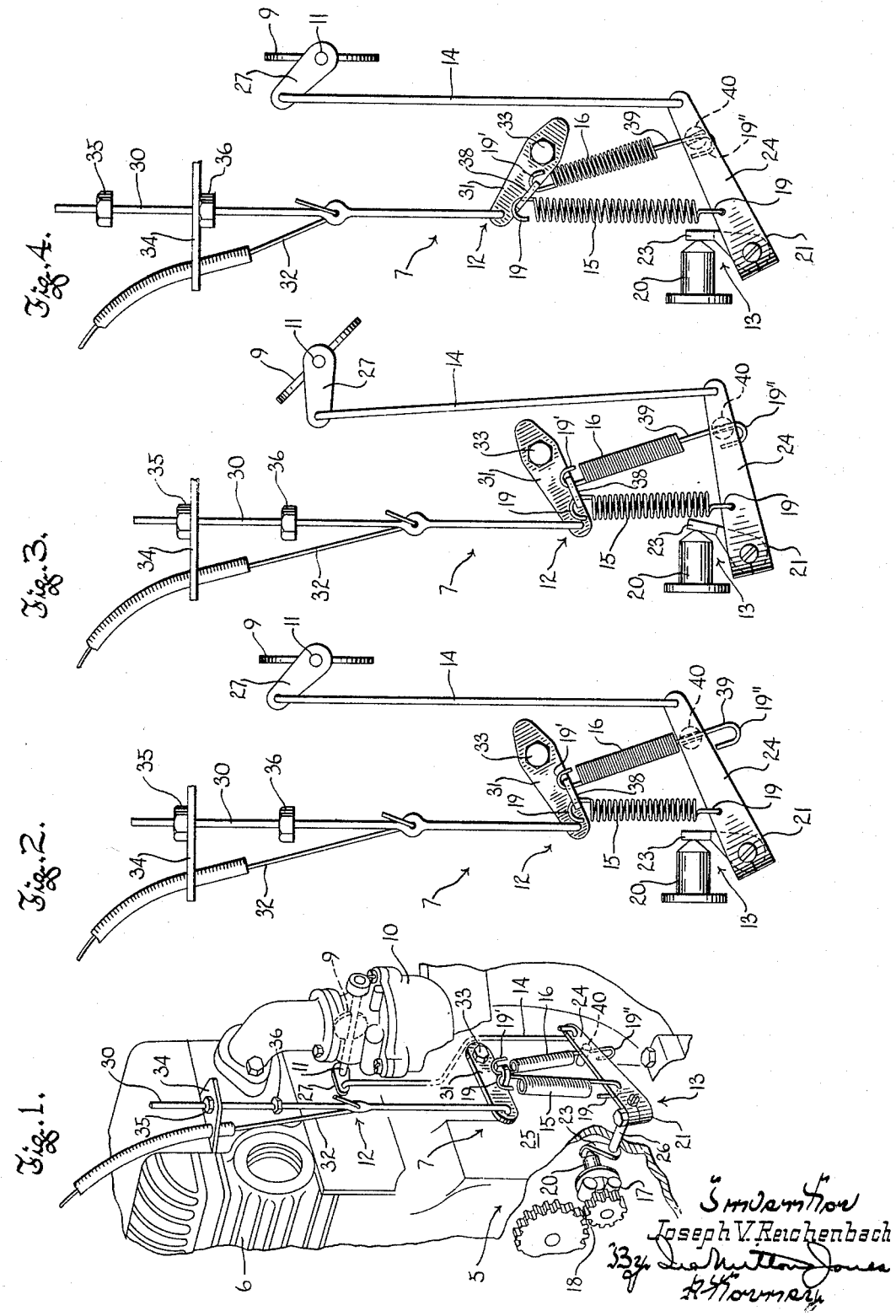

3,276,439
DUAL-RANGE GOVERNOR FOR INTERNAL
COMBUSTION ENGINES
Joseph V. Reichenbach, Milwaukee, Wis., assignor to
Briggs & Stratton Corporation, Milwaukee, Wis., a corporation of Delaware
Filed May 28, 1964, Ser. No. 370,834
8 Claims. (Cl. 123—98)

This invention pertains to governors for internal combustion engines, and relates more particularly to a dual-range governor which is capable of maintaining both a predetermined maximum speed of an engine and a predetermined low speed which is somewhat above the engine's minimum idling speed.

Overspeed governors for preventing engines from operating at speeds in excess of a predetermined high speed are well known and are used on the majority of small single-cylinder gasoline engines. Prior governors for small engines, however, have not been capable of affording satisfactory speed regulation at any speed substantially below the maximum that the governor was intended to maintain. Nevertheless, there are situations in which it is desirable to provide automatic speed regulation not only at and near the maximum speed of an engine but also at speeds near its idling speed.

An example of a single-cylinder engine installation that poses the need for a mechanism capable of automatically governing the engine at both its maximum and its minimum speeds is a garden tractor or similar machine in which a mower blade or other load can be clutched to the engine or declutched from it at any speed at which the engine may be running.

Usually the engine on such a machine has been provided with a manually adjustable speed control member that is movable between defined high speed and low speed positions. When the speed control member was set in its high speed position, the type of governor heretofore available maintained a maximum speed of, say, 3750 r.p.m., automatically opening or closing the throttle as necessary to compensate for changes in load on the engine. But in the low speed setting of the speed control the speed of the engine changed with every change in load, due to the inability of prior governors to provide effective regulation at any speed substantially below the maximum.

As a partial consequence of the inability of the governor to function in the lower speed ranges, the manual speed control member was ordinarily calibrated to provide a rather high engine speed at the low speed setting of the control member, and the control member therefore seemed to be ineffective to produce anything but a relatively narrow range of speeds.

Actually the engine was capable of idling at speeds as low as 700 r.p.m. or less, but practical considerations made it necessary to maintain the unloaded minimum operating speed at well over 1100 r.p.m.

One of these considerations had to do with a characteristic of all gasoline engines. When an engine is running at its lowest idling speed and its throttle is opened rapidly, the engine tends to be starved for fuel, and unless some mixture enrichment is provided for a short interval during and after throttle opening, the engine misses and may stop.

On the larger engines used on automobiles and the like, specialized apparatus in the carburetor effects temporary enrichment of the fuel-air mixture when the throttle is rapidly opened from a nearly closed position. But for reasons of economy and simplicity it is undesirable to provide an acceleration pump or the like in a small single-cylinder engine, and instead, the low speed position of the manual control is so fixed as to prevent the engine from being operated in the range of idling speeds below about 1100 r.p.m. in which critical throttle response obtains.

Heretofore, in calibrating the low speed setting of the speed control member, allowance had to be made for any load that might be coupled to the engine while it was running at low speed. This meant that the minimum unloaded speed of the engine had to be substantially above 1100 r.p.m. in order to insure that the engine would not drop down into the range of critical throttle operation when a load was connected to it. Because of this high unloaded idling speed of the engine, its range of speeds when unloaded was relatively narrow, and the engine seemed to respond very poorly to its manual speed control.

With these facts in mind, it is a general object of this invention to provide means for substantially increasing the available speed range of a simple single-cylinder engine, said means comprising a dual-range governor which is not only effective to prevent overspeeding above a predetermined high r.p.m. but which is also effective to maintain a minimum speed of the engine that is just above its range of critical throttle operation, so that the low speed setting of the engine speed control can be calibrated to provide an unloaded idling speed of about 1100 r.p.m. without danger that the engine will drop below that speed when a load is coupled to it.

Thus it is an object of this invention to provide an internal combustion engine governor which not only functions in the conventional manner to prevent overspeeding but which also effects such automatic opening or closing of the throttle with increase or decrease of load on the engine as to hold an idling speed that is just above the range of critical throttle operation.

Another object of this invention is to provide a dual-range governor for an internal combustion engine, and particularly for a small single-cylinder engine, which governor is accurately responsive at speeds near the maximum engine speed and also at speeds near predetermined idling speed, and has no tendency to hunt in either of its speed ranges.

A further object of this invention is to provide a dual-range governor of the character described which is very simple and inexpensive, and which thus constitutes a very satisfactory partial substitute for an accelerating pump or the like as a means for achieving a substantial increase in the practical speed range of a small engine without substantially increasing the cost or complexity of the engine.

It is also an object of this invention to provide a dual-range governor of the character described which comprises a simple and inexpensive modification of a heretofore conventional single-range governor, so that the principles of this invention are readily applicable to existing engine governors to adapt them for dual-range operation.

Still another object of this invention is to provide a dual-range engine speed governor of the character described which is easily adjusted in each of its high and low speed operating ranges, and wherein adjustment or calibration in one speed range of the governor does not affect adjustment or calibration in the other.

With the above and other objects in view which will appear as the description proceeds, this invention resides in a novel construction, combination and arrangement of parts substantially as hereinafter described and more particularly defined by the appended claims, it being understood that such changes in the precise embodiment of the herein-disclosed invention may be made as come within the scope of the claims.

The accompanying drawing illustrates one complete example of a physical embodiment of the invention constructed according to the best mode so far devised for the practical application of the principles thereof, and in which:

FIGURE 1 is a fragmentary side perspective view of an engine incorporating a dual-range governor embodying the principles of this invention, a portion of the engine crankcase being broken away to show details of the governor mechanism;

FIGURE 2 is a somewhat diagrammatic view in side elevation of the governor mechanism of this invention, shown adjusted for minimum speed and in the condition that obtains when the engine is not running;

FIGURE 3 is a view similar to FIGURE 2 but showing the conditions that exist when the engine is operating at minimum speed; and FIGURE 4 is a view similar to FIGURE 2 but showing the speed control mechanism adjusted for maximum engine speed and illustrating the conditions that exist when the engine is operating.

Referring now to the accompanying drawings, the numeral 5 designates generally the crankcase of a small internal combustion engine having a single cylinder 6 and which is equipped with a dual-range governor 7 embodying the principles of this invention.

As is conventional, the speed of the engine is controlled, generally speaking, by a movable throttle valve or butterfly 9 which is located in the throat of a carburetor 10 and which is mounted on a shaft 11 for flatwise swinging motion about a fixed axis. Engine speed tends to be increased by opening of the throttle 9 and decreased by closing of the throttle. The function of the governor 7 is to provide automatic adjustment of the throttle to compensate for variations in load and other conditions so as to keep the engine speed constant and in accordance with the setting of a manually adjustable engine speed control member 12.

The governor 7 comprises, in general, engine speed responsive means 13, a link 14 connecting the speed responsive means with the throttle 9, and a pair of tension springs 15 and 16 which are connected between the manual speed control member 12 and the speed responsive means 13 in a peculiar manner described hereinafter.

The speed responsive means comprises a centrifugally responsive flyweight mechanism 17 which is mounted within the engine crankcase 5 and driven by one of the timing gears 18. The flyweight mechanism can be of any known type, and is here illustrated as being generally similar to that in the governor mechanism disclosed in Patent No. 2,382,952 to W. E. Armstrong. It will be understood that the invention can be embodied in a governor having other types of speed responsive means (as for example an air vane governor mechanism), although a centrifugal mechanism can be expected to provide more reliable governing, especially in the low speed range.

In addition to the flyweight mechanism 17, the speed responsive means comprises a follower 20 by which centrifugally responsive radial movement of the flyweights is translated into axial back and forth motion, and a lever 21 which serves as a motion transmitting connection between the follower 20 and the link 14 to the throttle. The lever 21 has a short arm 23 inside the crankcase, in engagement with the rear end of the follower 20, and has a longer arm 24 at the exterior of the crankcase, extending rearwardly along one side wall 25 thereof. The two arms of the lever 21 are fixed to opposite ends of a shaft 26 that extends through and is journaled in the side wall 25 of the crankcase, and which thus provides the fulcrum of the lever 21.

The link 14 has pivotal connections at its opposite ends with the free end of the longer arm 24 of lever 21 and with a throttle arm 27 that is fixed on the throttle shaft 11 at the exterior of the carburetor.

As will be apparent from FIGURES 2–4, rearward motion of the follower 20 swings the shorter arm 23 of lever 21 rearwardly and swings the longer arm 24 downwardly, thereby effecting closing of the throttle through the link 14 and the throttle arm 27.

The manually adjustable engine speed control means comprises a rod 30 that is constrained to lengthwise up and down motion, a lever arm 31 that is mounted on the exterior of the crankcase side wall 25, above the lever arm 24 of the speed responsive means, and a Bowden wire 32. The lever arm 31, which swings about a fixed axis that may be provided by a bolt 33 threaded into the crankcase side wall 25, extends generally forwardly from the bolt and has at its front end a pivotal connection with the lower end of the rod 30 so as to be constrained to swing up and down in unison with lengthwise up and down movement of the rod. It will be observed that lever arms 31 and 24 are arranged to swing toward and from one another about fixed parallel axes.

The Bowden wire 32, which facilitates adjusting movement of the rod 30 and arm 31, is connected at one end to the medial portion of the rod, and a suitable actuator (not shown) can be connected to the other end of the Bowden wire at a location on the engine, or a machine on which the engine is installed, that is conveniently accessible to an operator.

The upper end portion of the rod 30 is guided in a horizontal plate 34 that is fixed on the cylinder head and through which the rod slidably extends. The plate 34 also cooperates with a pair of stop nuts 35 and 36 which are threaded onto the upper portion of the rod and which are adjustable to different spaced apart positions along the length of the rod to define the minimum speed and maximum speed setings of the manually adjustable speed control means.

The tension spring 15, which controls minimum speed governing operation (and which is therefore designated the low speed spring), has its opposite ends at all times respectively connected in force transmitting relationship with the lever arm 31 of the manual speed control means and with the lever arm 24 of the speed responsive means. To this end the opposite end portions of the spring are formed as hooks 19 which are engaged in holes in the lever arms 24 and 31.

With the speed control member 31 in its low speed position and the engine not operating (the condition illustrated in FIGURE 2), the low speed spring 15 exerts just enough biasing force upon the speed responsive member 24 to hold the throttle 9 fully open. However, when the engine begins to run with the speed control member 31 in its low speed position (see FIGURE 3), the magnitude of the biasing force exerted by the low speed spring increases with increasing rearward displacement of the follower 23; which is to say that spring 15 exerts an increasing biasing force as the throttle is moved toward its closed position in response to engine acceleration. Of course the biasing force exerted by spring 15 is also increased by movement of the manually adjustable control means toward its high speed position.

With proper adjustment of the upper (minimum speed) stop nut 35, the biasing force exerted by the low speed spring 15 will be in equilibrium with the centrifugal force of the flyweights, exerted through the lever 21, when engine speed is at about 1100 r.p.m., which is just above the range of critical throttle operation and substantially below the minimum speed heretofore considered practicable for small engines with clutch controlled loads. To provide the governor with adequate sensitivity for low speed operation, the low speed spring is connected to the lever arm 24 near the pivot axis of the latter, so that it acts upon the lever 21 with a small moment.

It will be apparent that with the speed control in the FIGURE 3 condition, governing action is generally conventional. If a load is clutched to the engine, the opposing forces exerted by the low speed spring 15 and the flyweight mechanism 17 react to open the throttle and keep the engine operating at the minimum speed for which the manual speed control is adjusted. If the load is uncoupled, the biasing force of the low speed spring is partially overcome by the flyweight mechanism, to close the throttle to the extent necessary for holding the desired idling speed.

When the manual speed control means is moved to its high speed position, illustrated in FIGURE 4, the tension of the low speed spring 15 is substantially increased, but its biasing force is not raised to a value high enough to counterbalance the forces exerted by the flyweight mechanism at substantially high engine speeds. The general reason for this is that centrifugal force upon the flyweight mechanism varies with the square of engine speed while spring force increases substantially linearly with spring deflection. Because of the leverages and linkages in the speed responsive means, the disparity between the opposing centrifugal and spring forces is not as great as this general statement would suggest, but the fact remains that a given spring can serve for close governing only within a small range of speeds.

Hence the high speed spring 16 is so connected between the manual speed control member 31 and the speed responsive member 24 as to have a lost motion connection with one of said members, whereby it exerts biasing force upon the speed responsive member 24 only when the speed control is in its high speed setting. As illustrated, the upper end portion of the high speed spring 16, like that of the low speed spring 15, is formed as a hook 19' which is engaged in a suitably apertured lug 38 on the speed control lever 31, so that the upper end of the high speed spring is constrained to move in unison with said lever. However, the lower end portion of the high speed spring is formed as a hook 19" having a straight elongated shank portion 39 which extends through an apertured laterally projecting boss 40 on the speed responsive member 24, so that the lower end of the high speed spring does not have a force transmitting connection with the lever 24 until the speed control means is moved almost all the way up to its maximum speed position. (Compare FIGURE 4 with FIGURES 2 and 3.)

The boss 40 with which the high speed spring 16 has its lost motion connection is fixed on the lever arm 24 at a substantially greater distance from the fulcrum of lever 21 than the connection with the low speed spring; hence when the high speed spring is operative it exerts a substantially large amount upon the lever 21, and its force is of course supplemented by the smaller moment of the low speed spring 15. It will be observed that because of the downwardly divergent angles defined by the axes of springs 15 and 16, the high speed spring exerts its pull substantially at right angles to the lever arm 24 when the speed control member 31 is moved to its high speed position at which the connection between spring 16 and lever arm 24 is rendered operative, further insuring a large effective moment of the high speed spring.

By suitable location of the boss 40 relative to the fulcrum of lever 21, the high speed spring can be coiled and calibrated to be substantially identical with the low speed spring 15 except for the longer shank 39 on its lower hook.

Operation of the governor mechanism with the speed control means in its high speed setting is conventional and needs no explanation.

From the foregoing description taken together with the accompanying drawings it will be apparent that this invention provides a dual-range governor for internal combustion engines capable of accurate speed maintenance both at high engine speed and at low engine speed. It will also be apparent that the governor of this invention permits the manual speed setting means of an engine in which the governor is installed to be calibrated for a substantially slower low speed setting than was possible with the governors heretofore available, inasmuch as the governor of this invention automatically opens the the throttle to compensate for any load that may be coupled to the engine when it is running at its minimum speed.

What is claimed as my invention is:

1. In an internal combustion engine having a throttle that can be opened and closed for controlling engine speed, an engine speed responsive member movable in opposite directions and linked to the throttle to move the same toward its closed position in consequence of engine acceleration and toward its open position in consequence of engine deceleration, and a control member mounted for manual adjusting movement between defined high speed and low speed positions:

(A) a low speed spring having its opposite ends at all times connected in force transmitting relationship with the speed responsive member and with the control member, respectively, so that said low speed spring reacts between said members to bias the speed responsive member in its throttle closing direction with a force which can be increased by movement of the control member toward its high speed position;

(B) a high speed spring; and (C) cooperating means on the high speed spring and on said members providing force transmitting connections between the opposite ends of the high speed spring and said members respectively, one of said last mentioned connections being a lost motion connection which is rendered operative by movement of the control member to its high speed position and inoperative by movement of the control member to its low speed position, so that when the control member is in its high speed position the high speed spring imposes upon the speed responsive member a biasing force which supplements that of the low speed spring.

2. A dual-range governor for an internal combustion engine having a throttle, and which governor is of the type comprising an engine speed responsive member movable in opposite directions and linked to the throttle, means for biasing the speed responsive member in its direction to open the throttle, and a manually adjustable member movable between defined high speed and low speed positions for varying the biasing force upon the speed responsive member, said dual-range governor being characterized by the following:

(A) the means for biasing the speed responsive member in its throttle-open direction comprises a pair of springs, each having connections between its opposite ends and said members, respectively;

(B) one of said springs has the connections at both of its ends at all times effective to impose reaction forces upon said members so that said one spring at all times imposes upon the speed responsive member a biasing force which can be increased by movement of the manually adjustable member toward its high speed position; and (C) the connection at one end of the other of said springs is a lost motion connection which is engaged by movement of the manually adjustable member toward its high speed position and which is disengaged by movement of the manually adjustable member to its low speed position.

3. The dual-range governor of claim 2 wherein said engine speed responsive member comprises a lever arm swingable in opposite directions about a fixed fulcrum, further characterized by the fact that: said second designated spring has its connection to the speed responsive member spaced from the fulcrum thereof at a greater distance than the connection of the first designated spring to said member, so that the second designated spring imposes a larger moment upon the speed responsive member.

4. In an internal combustion engine having a throttle movable in opposite directions toward open and closed positions, means for so regulating the position of the throttle as to closely govern the speed of the engine in both its high speed range and its low speed range, said means comprising:

(A) a speed responsive lever;
(B) a speed adjusting lever;
(C) means mounting said levers for swinging motion about fixed substantially parallel axes in directions toward and from one another;
(D) speed responsive means on the engine for swinging the speed responsive lever in its direction away from the speed adjusting lever in consequence of engine acceleration;
(E) means connecting the speed responsive lever with the throttle for closing the throttle in consequence of swinging of said lever in said direction and opening the throttle in consequence of swinging of said lever in the opposite direction;
(F) means for manually adjusting the speed adjusting lever toward and from the speed responsive lever respectively to define low speed and high speed positions;
(G) a first tension spring having opposite hooklike ends which are at all times respectively connected in force transfer relationship with said levers so that said first tension spring reacts between the levers to bias the speed responsive lever in its said opposite direction with a small moment which provides for governing at low engine speeds;
(H) a boss on one of said levers having a hole therethrough, the axis of said hole being transverse to the length of said lever and to its swinging axis; and
(I) a second tension spring having
  (1) a hook-shaped end portion with a long shank which loosely extends through the hole in said boss to provide a lost motion force transmitting connection between the second tension spring and said one lever, and
  (2) a hook shaped portion at its other end which is at all times connected in force transmitting relationship with the other lever,
  so that the second tension spring is effective to bias the speed responsive lever in its said opposite direction only when the speed control lever is near its high speed position.

5. The apparatus of claim 4, further characterized by the fact that: the connection between the second tension spring and the speed responsive lever is spaced a greater distance from the axis of said lever than the connection of the first tension spring therewith so that the second tension spring, when operative, exerts a larger moment upon the speed responsive lever.

6. In a governor for an internal combustion engine having a throttle, and which governor comprises engine speed responsive means having a throttle regulating lever swingable in opposite directions about a fixed fulcrum and linked to the throttle to move the same toward a closed position in consequence of engine acceleration and toward an open position in consequence of engine deceleration, and a manually adjustable speed adjusting member movable between defined high speed and low speed positions:

(A) spring means for biasing the throttle adjusting lever in its throttle opening direction;
(B) means cooperating with said spring means, the throttle regulating lever and the speed adjusting member, operative when the speed adjusting member is in its low speed position, for applying biasing force to the throttle regulating lever at a small distance from its fulcrum, for governing the position of the throttle at low engine speeds; and
(C) means cooperating with the spring means, the throttle regulating lever and the speed adjusting member, rendered operative by movement of the speed adjusting member to its high speed position for applying biasing force to the throttle regulating lever at a large distance from its fulcrum, for governing the position of the throttle at high engine speeds, said last named means being rendered inoperative by movement of the speed adjusting member to its low speed position.

7. An engine governor of the type comprising a lever member swingable in opposite directions about a fixed fulcrum and linked with the throttle of an engine to open and close the same, engine speed responsive means connected with said lever member for swinging the same in its throttle closing direction in consequence of increase in engine speed, a manually adjustable speed control member movable between defined high speed and low speed positions, and spring means connected with and reacting between said members to bias the lever member in its direction to open the throttle, said governor being characterized by the following:

(A) said spring means comprises a pair of springs;
(B) one of said springs is connected to the lever member near the fulcrum thereof so as to impose small moments upon the lever member which enable the governor to be effective for speed regulation at low engine speeds; and
(C) the other of said springs has
  (1) a force transmitting connection between one of its ends and one of said members and
  (2) a lost motion connection between its other end and the other of said members which connection is disengaged by movement of the manually adjustable member to its low speed position and is rendered operative by movement of the manually adjustable member to its high speed position,
  the connection between said other spring and the lever member being spaced a greater distance from the fulcrum of the lever member so that when the manually adjustable member is in its high speed position said other spring imposes substantially larger moments upon the lever member to enable the governor to be effective in regulating high engine speeds.

8. In a governor for an internal combustion engine having a throttle, and which governor comprises engine speed responsive means having a throttle regulating lever swingable in opposite directions about a fixed fulcrum and linked to the throttle to move the same toward a closed position in consequence of engine acceleration and toward an open position in consequence of engine deceleration, and a manually adjustable speed adjusting member movable between defined high speed and low speed positions:

(A) biasing means for biasing the throttle regulating lever in its throttle opening direction;
(B) means providing a connection between the speed adjusting member and the biasing means, whereby the force exerted by the biasing means is controlled by the speed adjusting member;
(C) means providing a first force transmitting connection between the biasing means and the throttle regulating lever, which connection is spaced a distance along the lever from its fulcrum and is operative when the speed adjusting member is in its low speed position to impose a small moment upon the lever that tends to swing the lever in its throttle opening direction;
(D) means for establishing a second force transmitting connection between the biasing means and the throttle regulating lever at a greater distance along the lever from its fulcrum; and (E) means connected with the speed adjusting member and with the biasing means for rendering said second force transmitting connection inoperative when the speed adjusting member is in its low speed position and operative when the speed adjusting member is in its high speed position, to thereby impose upon the lever a substantially larger swinging moment in its direction to open the throttle when the speed adjusting member is in its high speed position.

References Cited by the Examiner

UNITED STATES PATENTS

| | | | |
|---|---|---|---|
| 2,241,096 | 5/1941 | McCullough | 123—140 X |
| 2,382,952 | 8/1945 | Armstrong | 123—108 |
| 2,837,070 | 6/1958 | Agar | 123—108 |

MARK NEWMAN, *Primary Examiner.*

LAURENCE M. GOODRIDGE, *Examiner.*